(12) United States Patent
Yang

(10) Patent No.: US 8,415,892 B2
(45) Date of Patent: Apr. 9, 2013

(54) VOLTAGE-LIMITING AND REVERSE POLARITY SERIES TYPE LED DEVICE

(76) Inventor: Tai-Her Yang, Dzan-Hwa (TW)

(*) Notice: Subject to any disclaimer, the term of this patent is extended or adjusted under 35 U.S.C. 154(b) by 475 days.

(21) Appl. No.: 12/648,345

(22) Filed: Dec. 29, 2009

(65) Prior Publication Data

US 2011/0133642 A1 Jun. 9, 2011

Related U.S. Application Data

(63) Continuation-in-part of application No. 12/630,902, filed on Dec. 4, 2009, now abandoned.

(51) Int. Cl.
*H05B 41/36* (2006.01)
(52) U.S. Cl.
USPC ............ 315/224; 315/291; 315/307; 315/311

(58) Field of Classification Search .............. 315/86–90, 315/119, 121, 122, 126, 160, 161, 291, 294, 315/295, 297, 299, 312
See application file for complete search history.

(56) References Cited

U.S. PATENT DOCUMENTS
2002/0043943 A1* 4/2002 Menzer et al. ................ 315/291
* cited by examiner

*Primary Examiner* — Douglas W Owens
*Assistant Examiner* — Jianzi Chen
(74) *Attorney, Agent, or Firm* — Bacon & Thomas, PLLC

(57) ABSTRACT

The present invention provides LEDs and zener diodes that are homopolar and connected in parallel to constitute the first set of LED and zener diode and a second set of LED and zener diode; the first LED and zener diode set and the second LED and zener diode assume a reverse polarity series connection to constitute the tandem LED device with voltage limited and reverse polarity; through the selection of connecting pins, it is used on direct current power source or alternating current power source which is its characteristics.

13 Claims, 4 Drawing Sheets

VOLTAGE-LIMITING AND REVERSE POLARITY SERIES TYPE LED DEVICE

CROSS-REFERENCE TO RELATED APPLICATION

This application is a Continuation-In-Part of my patent application, Ser. No. 12/630,902, filed on Dec. 4, 2009.

BACKGROUND OF THE INVENTION (a) Field of the Invention

The present invention relates to a tandem LED device with voltage limited and reverse polarity composed of zener diodes and LEDs, and through a selection of connecting pins, are usable on direct current power or alternating current power as its characteristics.

(b) Description of the Prior Art

Currently LEDs are divided into direct current electric energy drive and alternating current LED which is driven by alternating current through reverse polarity parallel connection of LEDs. Their usages are relatively inflexible. Moreover, when the alternating current drives the alternating current LED, the working time of the individual reverse-poled parallel-connected LED are reduced to half which accounts for its shortcoming.

SUMMARY OF THE INVENTION

The present invention of a tandem LED device with voltage limited and reverse polarity is constituted of zener diodes and LEDs. It parallel-connects one or more homopolar parallel-connected or series-connected or series and parallel-connected LEDs and zener diodes of the same working polarity in order to form the first LED and zener diode set; and a second LED and zener diode set constituted of one or more homopolar parallel-connected or series-connected or parallel and series-connected LEDs connected in parallel with zener diodes of the same working polarity. Through the reverse-polarity series connection of the first LED and zener diode set with the second LED and zener diode set, a tandem LED device with voltage limited and reverse polarity is formed.

Moreover, during applications, the tandem LED device with voltage limited and reverse polarity further connects current-limiting impedance and/or power storing and discharging device formed by drive circuits in order to produce the required operational characteristics.

DESCRIPTION OF MAIN COMPONENT SYMBOLS (101),(102): LED
(203),(204): Diodes
(301),(302): Power storing and discharging device
(400),(401),(402): Current-limiting impedance elements
(501),(502): Zener diodes
Terminal (a): First LED and zener diode set connection terminal
Terminal (b): First LED and zener diode set and second LED and zener diode set reverse polarity series connection terminal
Terminal (c): Second LED and zener diode set connection terminal

DETAILED DESCRIPTION OF THE PREFERRED EMBODIMENTS

The LED referred to in the present invention is the abbreviation of Light-emitting diode.

Currently LEDs are divided into direct current electric energy drive and alternating current LED which is driven by alternating current through reverse polarity parallel connection of LEDs. Their usages are relatively inflexible. Moreover, when the alternating current drives the alternating current LED, the working time of the individual reverse-poled parallel-connected LED are reduced to half which accounts for its shortcoming.

The present invention provides a tandem LED device with voltage limited and reverse polarity and that, through a selection of pins, are usable on direct current power or alternating current power for the convenience of users.

The present invention of a tandem LED device with voltage limited and reverse polarity is constituted of zener diodes and LEDs. It parallel-connects one or more homopolar parallel-connected or series-connected or series and parallel-connected LEDs and zener diodes of the same working polarity in order to form the first LED and zener diode set; and a second LED and zener diode set constituted of one or more homopolar parallel-connected or series-connected or parallel and series-connected LEDs connected in parallel with zener diodes of the same working polarity. Through the reverse-polarity series connection of the first LED and zener diode set with the second LED and zener diode set, a tandem LED device with voltage limited and reverse polarity is formed.

Moreover, during applications, the tandem LED device with voltage limited and reverse polarity further connects the drive circuits constituted of current-limiting impedance and/or power storing and discharging device in order to produce the required operational characteristics.

Figure 1:
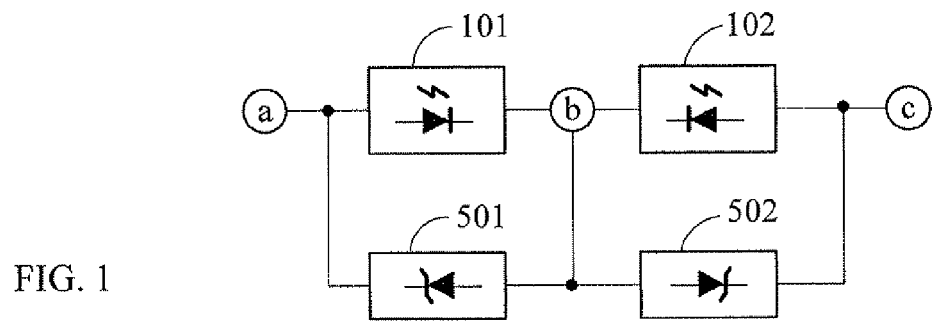
FIG. 1 is the circuit diagram of the tandem LED device with voltage limited and reverse polarity of the present invention.

The following are the main components of the tandem LED device with voltage limited and reverse polarity:

FIG. 1 is the circuit diagram of the tandem LED device with voltage limited and reverse polarity of the present invention.

The main components in FIG. 1 include:

LED (101): Composed of one or more homopolar parallel-connected or series-connected or series and parallel-connected light-emitting diodes.

LED (102): Composed of one or more homopolar parallel-connected or series-connected or series and parallel-connected light-emitting diodes.

Zener diodes (501), (502): Composed of one or more zener diodes or electrical devices of the same function that during multiple installations, are connected in parallel or in series or in series and parallel.

LED (101) and zener diode (501) of the same working polarity are connected in parallel to constitute the first LED and zener diode set; LED (102) and zener diode (502) of the same working polarity are connected in parallel to constitute the second LED and zener diode set.

The tandem LED device with voltage limited and reverse polarity is constituted by the reverse polarity series connection of the first LED and zener diode set with the second LED and zener diode set.

The method of installation for the external conducting interface of the tandem LED device with voltage limited and reverse polarity includes:

The installation of a conducting interface device at terminal (a) which is the connection terminal of the first LED and zener diode set of the tandem LED device with voltage limited and reverse polarity; the installation of a conducting interface device at terminal (b) which is the connection terminal of the first LED and zener diode set with the second LED and zener diode set in reverse polarity series connection; and the installation of a conducting interface at terminal (c) which is the connection terminal of the second LED and zener diode set for application on alternating current power or direct current power polarity alternation or direct current power.

Moreover, the installation of a conducting interface device at terminal (a) which is the connection terminal of the first LED and zener diode set of the tandem LED device with voltage limited and reverse polarity; the non-installation of a conducting interface device at the connection terminal of the first LED and zener diode set with the second LED and zener diode set in reverse polarity series connection; and the installation of a conducting interface at the terminal (c) which is the connection terminal of the second LED and zener diode set for application on alternating current power or alternating polarity direct current power.

Figure 2:
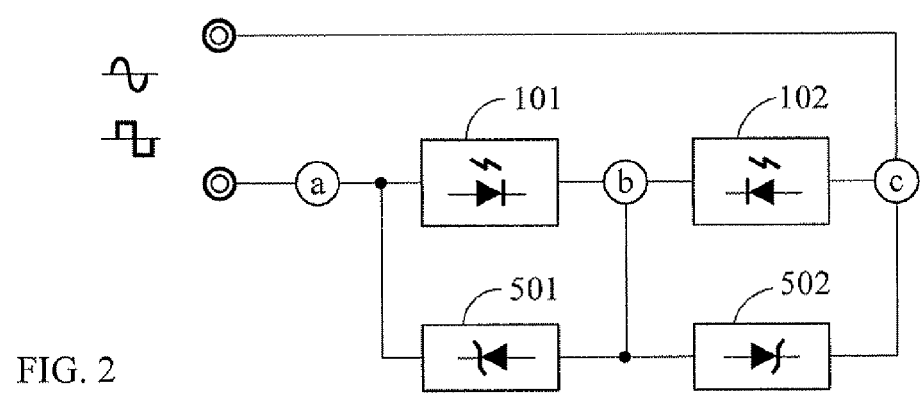
FIG. 2 is the circuit diagram of the tandem LED device with voltage limited and reverse polarity of the present invention as applied on the alternating current power source and connected in series with the impedance elements.
Figure 3:
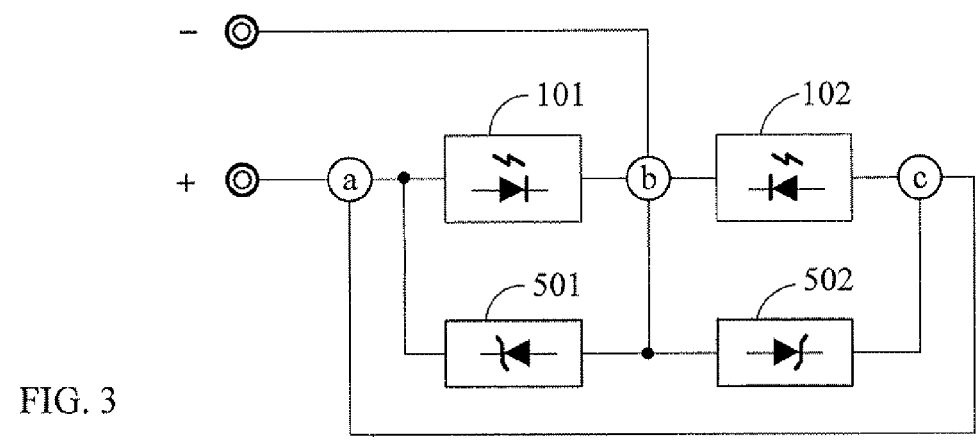
FIG. 3 is the circuit diagram of the tandem LED device with voltage limited and reverse polarity of the present invention as applied on the direct current power source.

When alternating current power or alternating polarity direct current power is delivered from the (a) terminal conducting interface device and the (c) terminal conducting interface device, the tandem LED device with voltage limited and reverse polarity is made to function as a alternating current LED. Moreover, during various voltage polarities, zener diode (501) and zener diode (502) provide voltage-limiting protection for the parallel-connected LED (101) and LED (102). When the working LED (102) is at the first polarity status, the alternating current power or the alternating polarity direct current power relies on the reverse polarity diode function of the zener diode (501) to pass electrical current through LED (102). And when the alternating current power or the alternating polarity direct current power changes to the second polarity (opposite to the first polarity) status, it relies on the reverse polarity diode function of diode (502) to pass electrical current through LED (101). FIG. 2 is the circuit diagram of the tandem LED device with voltage limited and reverse polarity of the present invention as applied on the alternating current power source and connected in series with the impedance elements, or When terminal (a) conducting interface device connects with terminal (c) conducting interface device, their connection terminal and terminal (b) commonly allow direct current to pass through LED (101) and LED (102). Zener diode (501) and zener diode (502) together provide voltage-limiting protection for LED (101) and LED (102) to enable the tandem LED device with voltage limited and reverse polarity to run with direct current LED functions. FIG. 3 is the circuit diagram of the tandem LED device with voltage limited and reverse polarity of the present invention as applied on the direct current power source.

When applied on alternating current power or alternating polarity direct current power, the tandem LED device with voltage limited and reverse polarity is series-connect current-limiting impedance element (400) between conducting interface device at terminal (a) or conducting interface device at terminal (c) of the tandem LED device with voltage limited and reverse polarity and the alternating current power or the alternating polarity direct current power and/or connect the current-limiting impedance element (401) in series with LED (101) and/or connect the current-limiting impedance element (402) with LED (102).

Figure 4:
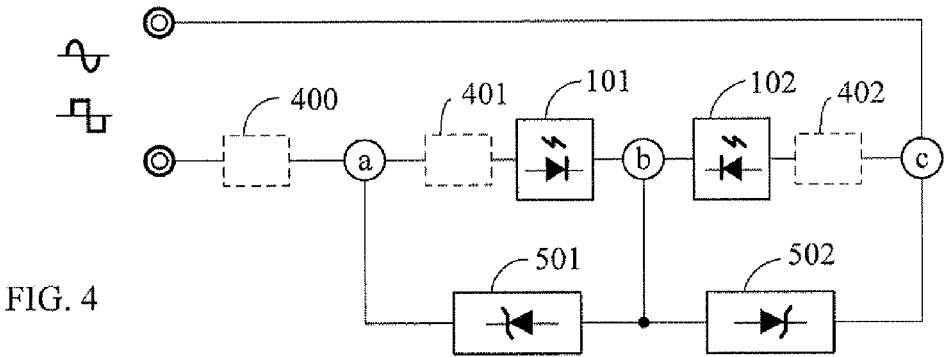
FIG. 4 is the circuit diagram of the tandem LED device with voltage limited and reverse polarity of the present invention as applied on the alternating current power source and connected in series with the impedance elements.

FIG. 4 is the circuit diagram of the tandem LED device with voltage limited and reverse polarity of the present invention as applied on the alternating current power source and connected in series with the impedance elements.

As shown in FIG. 4, the impedance elements are constituted by one or more impedance elements which include 1) resistive impedance elements; 2) capacitive impedance elements; 3) inductive impedance elements; 4) linear transistor impedance elements; 5) chopped wave switch type elements composed of solid state switch type elements; 6) chopped wave switch type elements composed of thyristors.

The series connection positions of the aforementioned impedance elements include 1) the impedance elements first connect with individual LEDs in series then connect in parallel with the zener diode; and/or 2) the impedance element is series-connected between the power source and the tandem LED device with voltage limited and reverse polarity; and/or 3) the LED and the diode with the same working polarity first connect in parallel then connect in series with the impedance element.

When applied on direct current power, the tandem LED device with voltage limited and reverse polarity limits the electrical current flowing through the tandem LED device with voltage limited and reverse polarity. Furthermore: 1) current-limiting impedance element (400) is connected in series between the power source and the connection terminal of terminal (a) conducting interface device and terminal (c) conducting interface device of the tandem LED device with voltage limited and reverse polarity; and/or 2) current-limiting impedance element (400) is connected in series between the direct current power source and the terminal (b) conducting interface device of the tandem LED device with voltage limited and reverse polarity; and/or 3) LED (101) first connects in series with current-limiting impedance element (401) and then connects in parallel with zener diode (501) and/or 4) LED (102) first connects in series with current-limiting impedance element 402 and then connects in parallel with zener diode (502).

Figure 5:
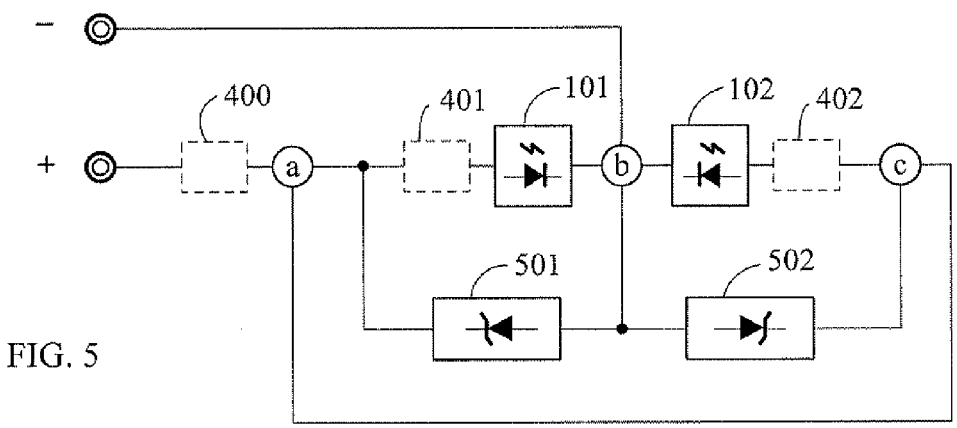
FIG. 5 is the circuit diagram of the tandem LED device with voltage limited and reverse polarity of the present invention as applied on the direct current power source and connected in series with the impedance elements.

FIG. 5 is the circuit diagram of the tandem LED device with voltage limited and reverse polarity of the present invention as applied on the direct current power source and connected in series with the impedance elements.

As shown in FIG. 5, the impedance elements are constituted by one or more impedance elements which include 1) resistive impedance elements; 2) linear transistor impedance elements; 3) chopped wave switch type elements composed of solid state switch type elements; 4) chopped wave switch type elements composed of thyristors.

The series connection positions of the aforementioned impedance elements include 1) the impedance elements first connect with individual LEDs in series then connect in parallel with the zener diode; and/or 2) the impedance element is series-connected between the power source and reverse polarity series type LED device; and/or 3) the LED and the zener diode with the same working polarity first connect in parallel then connect in series with the impedance element.

When applied on alternating current power, the tandem LED device with voltage limited and reverse polarity further connects in series a current-limiting impedance element (400) between the alternating power source and terminal (a) and/or terminal (c) of the tandem LED device with voltage limited and reverse polarity; and/or a current-limiting impedance element (400) is connected in series to LED (101) and/or a current-limiting impedance element (402) is connected in series with LED (102); zener diode (501) is connected in parallel in between terminal (a) and terminal (b), zener diode (502) is connected in parallel in between terminal (b) and terminal (c); both terminals of zener diode (501) are connected in parallel with the power storing and discharging device (301) and/or both terminals of zener diode (502) are connected in parallel with the power storing and discharging device (302). Their polarities during the delivery of alternating current power are such that they assume a power supply status with respect to the LED with which they are connected in parallel. When the power supply voltage is higher than the voltage of its parallel-connected power storing and discharging device, the power source simultaneously supplies power to the LED and charges the power storing and discharging device with which it is connected in parallel. The polarities of the alternating current power supply do not supply power to its parallel-connected LED or when the power supply voltage is lower than the voltage of the power storing and discharging device, the power storing and discharging device will supply power to the LED with which it is connected in parallel.

Figure 6:
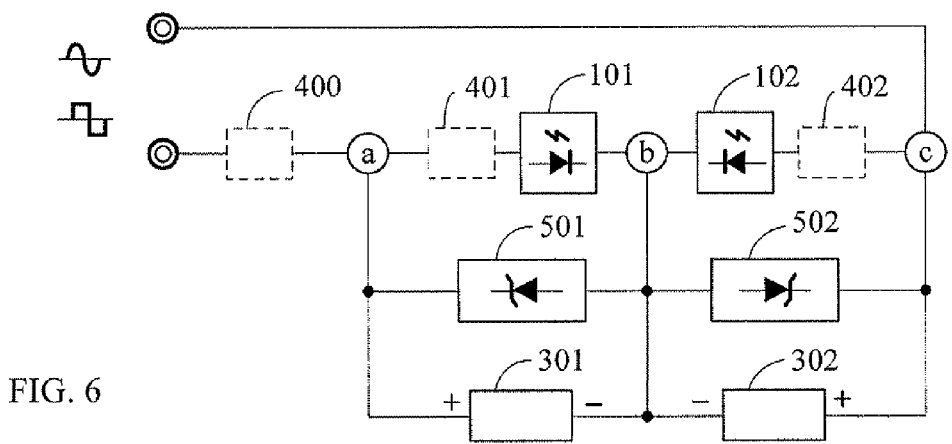
FIG. 6 is the circuit diagram of the present invention wherein the LEDs are connected in series with the current-limiting impedance elements as well as connected in parallel with the power storing and discharging devices, and connected in parallel with the zener diodes.

By means of the operation of the power storing and discharging device, the following partial or complete functions are attained: 1) enables two LEDs to deliver power and emit light without being affected by the polarity changes of the alternating current power source; 2) when alternating current power is driving the LED, optical pulsation of the LED is reduced; 3) supplies delay electric energy for LED when power is cut off; 4) serves as power supply to allow continuous lighting of LEDs during an emergency power shutdown. The power storing and discharging device is consisted of a rechargeable battery or a monopolar or bipolar capacitance or super capacitance; FIG. 6 is the circuit diagram of the present invention wherein the LEDs are connected in series with the current-limiting impedance elements as well as connected in parallel with the power storing and discharging devices and the zener diodes.

When the tandem LED device with voltage limited and reverse polarity are applied on the alternating current power, a current-limiting impedance element (400) is series connected to the (a) or (c) terminals of the alternating current power and the reverse polarity series type LED and/or a current-limiting impedance element (401) is series connected to LED (101), and according to the direction of the light-emitting current of LED (101), it is connected in series with diode (203), then through the current input terminal of diode (203) and the current output terminal of LED (101), it assumes the same working current flow and connects in parallel with zener diode (501) in order to protect LED (101). i.e., zener diode (501) is for parallel connection to terminal (a) and terminal (b); and/or a current-limiting impedance element (402) is series-connected to LED (102), and according to the direction of light-emitting current of LED (102), it is connected in series to diode (204), and then through the current input end of diode (204) and the current output end of LED (102), it assumes the same current flow and connects in parallel with zener diode (502) in order to protect LED (102) i.e., zener diode (502) is for parallel connection to terminal (b) and terminal (c); a power storing and discharging device (301) is connected in parallel between the joint connecting diode (203) and the current-limiting impedance element (401) and the current output terminal of LED (101), and/or a power storing and discharging device (302) is connected in parallel between the joint connecting diode (204) and current-limiting impedance element (402) and the current output terminal of LED (102). Their polarities during the delivery of alternating current power are such that they assume a power supply status with respect to the LED with which they are connected in parallel. When the power supply voltage is higher than the voltage of its parallel-connected power storing and discharging device, the power source simultaneously supplies power to the LED and charges the power storing and discharging device with which it is connected in parallel. The polarities of the alternating current power supply do not supply power to its parallel-connected LED. When the power supply voltage is lower than the voltage of the power storing and discharging device, the power storing and discharging device will supply power to the LED with which it is connected in parallel.

By means of the operation of the power storing and discharging device, the following partial or complete functions are attained: 1) enables two LEDs to deliver power and emit light without being affected by the polarity changes of the alternating current power source; 2) when alternating current power is driving the LED, optical pulsation of the LED is reduced; 3) supplies delay electric energy for LED when power is cut off; 4) serves as power supply to allow continuous lighting of LEDs during an emergency power shutdown. The power storing and discharging device is consisted of a rechargeable battery or a monopolar or bipolar capacitance or super capacitance.

Figure 7:
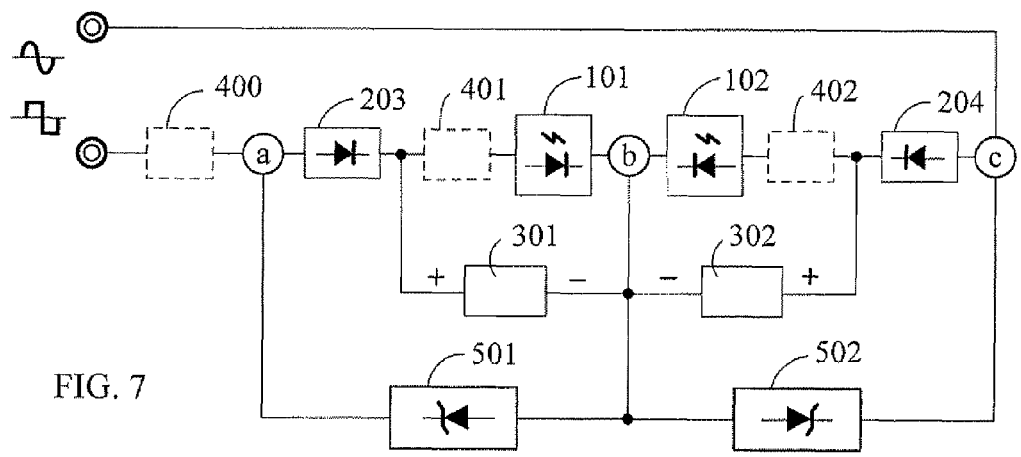
FIG. 7 is the circuit diagram of the present invention in FIG. 6 wherein the LEDs are connected in series with the current-limiting impedance elements then connected in parallel with the power storing and discharging device, then connected in series again with the blocking diodes and finally connected in parallel with the zener diodes.

FIG. 7 is the circuit diagram of the present invention in FIG. 6 wherein the LEDs are connected in series with the current-limiting impedance elements then are connected in parallel with the power storing and discharging devices, then again are connected in series with blocking diodes and finally, are connected in parallel with zener diodes.

In the operational diagrams of FIG. 6 and FIG. 7 wherein the tandem LED device with voltage limited and reverse polarity is applied on alternating current power and connected in parallel with the power storing and discharging devices, the current-limiting impedance element (400) and/or current-limiting impedance elements (401) and/or current-limiting impedance element (402) are optionally installed.

Figure 8:
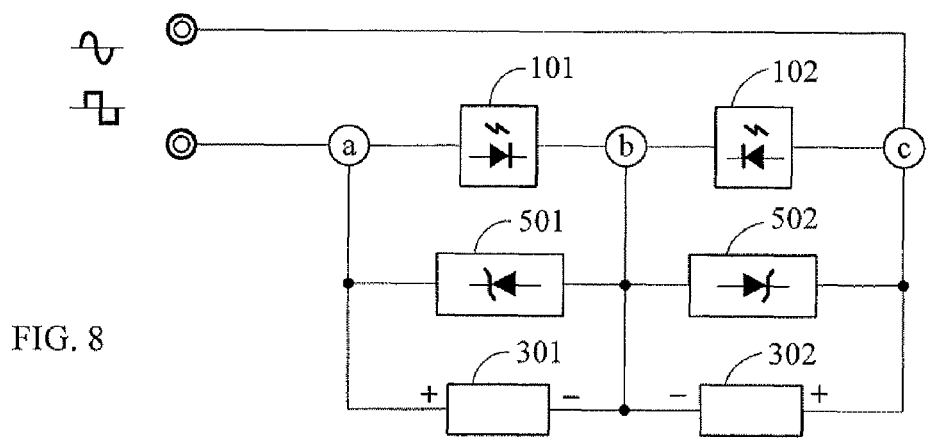
FIG. 8 is the operational circuit diagram of the present invention in FIG. 6 wherein impedance elements are not installed.

FIG. 8 is the operational circuit diagram of FIG. 6 wherein impedance elements are not installed.

Figure 9:
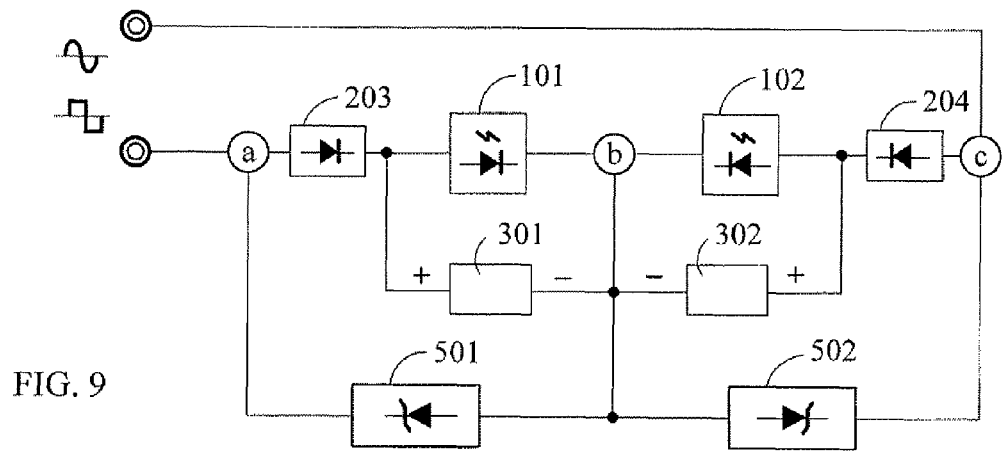
FIG. 9 is the operational circuit diagram of the present invention in FIG. 7 wherein impedance elements are not installed.

FIG. 9 is the operational circuit diagram of FIG. 7 wherein impedance elements are not installed.

Figure 10:
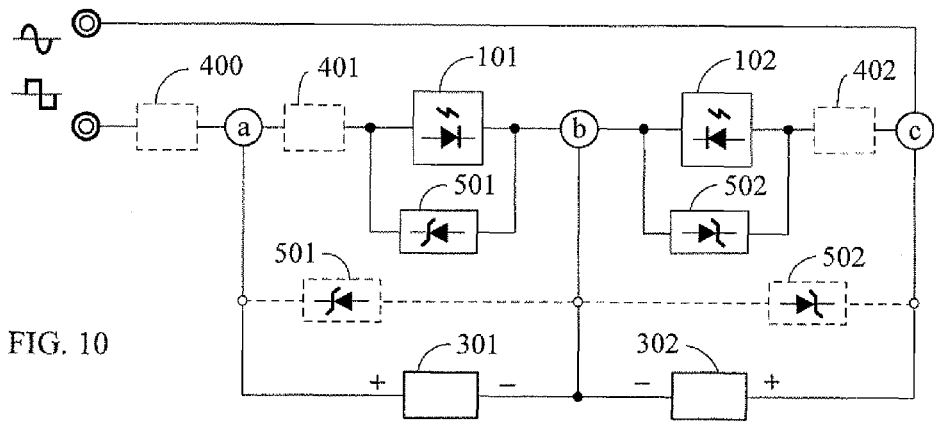
FIG. 10 is the operational circuit diagram of the present invention in FIG. 6 wherein the LEDs are connected in parallel with the zener diodes.

The tandem LED device with voltage limited and reverse polarity as applied in the operational circuits of FIGS. 6, 9, and 10 wherein the zener diode (501) connected in parallel between terminal (a) and terminal (b) of the tandem LED device with voltage limited and reverse polarity and/or zener diode (502) connected in parallel with terminal (b) and terminal (c) of the tandem LED device with voltage limited and reverse polarity are revised, installed, and connected in parallel with LED (101) and/or LED (102), or installed on both locations.

FIG. 10 is the operational circuit diagram of the LEDs connected in parallel with the zener diodes in FIG. 6.

Figure 11:
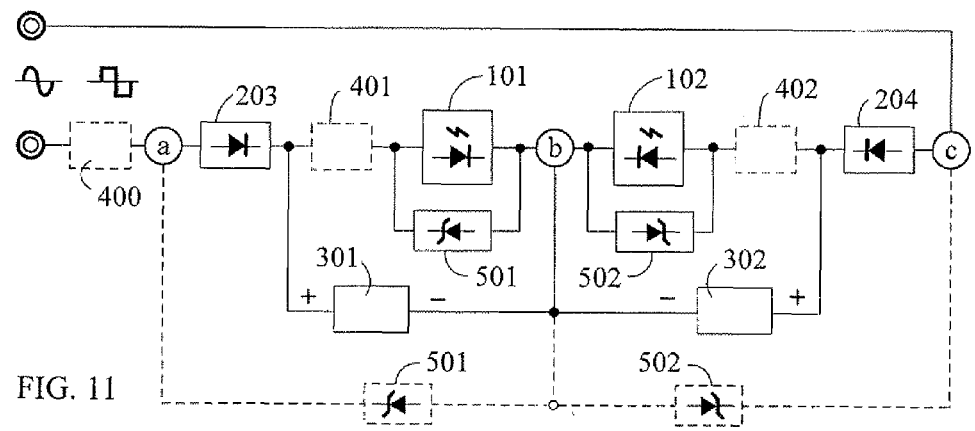
FIG. 11 is the operational circuit diagram of the present invention in FIG. 7 wherein the LEDs are connected in parallel with the zener diodes

FIG. 11 is the operational circuit diagram of the LEDs connected in parallel with the zener diodes in FIG. 7.

Figure 12:
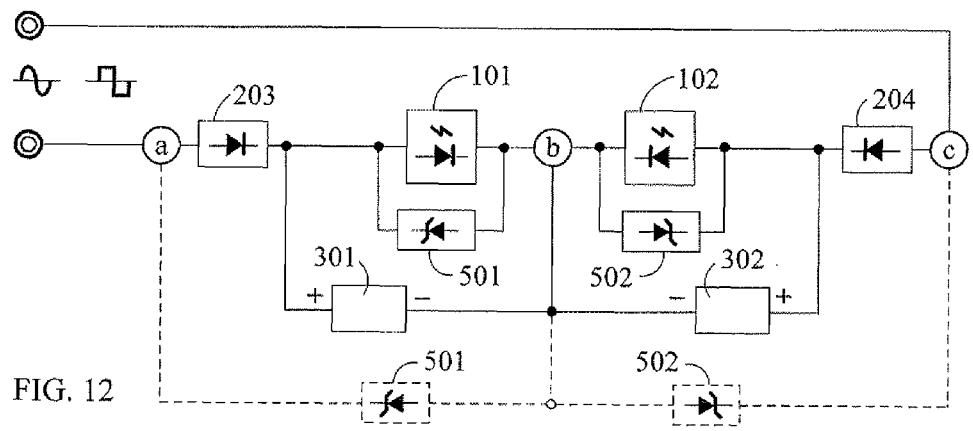
FIG. 12 is the operational circuit diagram of the present invention in FIG. 9 wherein the LEDs are connected in parallel with the zener diodes.

FIG. 12 is the operational circuit diagram of the LEDs connected in parallel with the zener diodes in FIG. 9.

The zener diode which provides the voltage-limiting protection for the LED of the tandem LED device with voltage limited and reverse polarity are replaceable with electrical devices which include semiconducting elements and devices and machine electronics with voltage-limiting effects and reverse polarity conduction.

During actual applications, the following options are available for pertinent elements of the tandem LED device with voltage limited and reverse polarity:
1) The specifications for power, voltages, currents and numbers as well as the series or parallel or series-parallel connections of LED (101) and LED (102) are the same with or different from each other;
2) The colors of lights emitted by the energized LED (101) and LED (102) are the same with or different from each other;
3) The types and specifications of the current-limiting element (400) and/or current-limiting element (401) and/or current-limiting element (402) are the same with or different from each other;
4) The current-limiting impedance element (400) and/or the current-limiting impedance element (401) and/or the current-limiting impedance (402) are fixed impedances and adjustable impedance values or clipping controlled or linear controlled in order to control LED light adjustments. This includes simultaneous or separate control of LED (101) and LED (102);
5) The types and specifications of the power storing and discharging device (301) and/or power storing and discharging device (302) are the same with or different from each other;
6) The types and specifications of the zener diode (501) and zener diode (502) are the same with or different from each other.

In actual applications, the frequently-used structural modes of the tandem LED device with voltage limited and reverse polarity are include:
1) The individual elements that constitute the tandem LED device with voltage limited and reverse polarity are independent structures. The external connections and individual elements rely on conducting interface devices such as conduction terminals, and/or conducting wire, and/or electrical conductors, and/or plugs, and/or sockets to connect or solder or lock for connections; and/or
2) Two or more individual elements form an integrated package and conducting interface devices are installed. The external connections and individual elements of other parts rely on conducting interface devices such as conduction terminals, and/or conducting wire, and/or electrical conductors, and/or plugs, and/or sockets to connect or solder or lock for connections; and/or
3) The first LED and zener diode set is an integrated package and conducting interface devices are installed. The second LED and zener diode set is an integrated package and conducting interface devices are installed. Between them, conducting interface devices such as conduction terminals, and/or conducting wire, and/or electrical conductors, and/or plugs, and/or sockets make connections or solder or lock for connections; and/or
4) The whole tandem LED device with voltage limited and reverse polarity is integrated into a single package. Conducting interface devices such as conduction terminals, and/or conducting wire, and/or electrical conductors, and/or plugs, and/or sockets are installed to make external connections or methods such as soldering or locking are used for external connections.

In actual applications, the formation of hardware structures between the tandem LED device with voltage limited and reverse polarity and its peripheral devices or circuit elements can be configured to requirements under the principle of invariable circuit.

The invention claimed is:

1. A voltage-limiting and reverse polarity series type LED device that parallel-connects one or more homopolar parallel-connected or series-connected or series and parallel-connected LEDs and zener diodes of the same working polarity in order to form the first LED and zener diode set; and a second LED and zener diode set constituted of one or more homopolar parallel-connected or series-connected or parallel and series-connected LEDs connected in parallel with zener diodes of the same working polarity, wherein through the reverse-polarity series connection of the first LED and zener diode set with the second LED and zener diode set, a voltage-limiting and reverse polarity series type LED device is formed, said voltage-limiting and reverse polarity series type LED device comprising:
  LED (101): composed of one or more homopolar parallel-connected or series-connected or series and parallel-connected light-emitting diodes;
  LED (102): composed of one or more homopolar parallel-connected or series-connected or series and parallel-connected light-emitting diodes;
  zener diodes (501), (502): composed of one or more zener diodes or electrical devices of the same function that during multiple installations, are connected in parallel or in series or in series and parallel, wherein:
  LED (101) and zener diode (501) of the same working polarity are connected in parallel to constitute the first LED and zener diode set; LED (102) and zener diode (502) of the same working polarity are connected in parallel to constitute the second LED and zener diode set;
  the voltage-limiting and reverse polarity series type LED device is constituted by the reverse polarity series connection of the first LED and zener diode set with the second LED and zener diode set;
  the voltage-limiting and reverse polarity series type LED device is an integrated package composed of the two aforementioned sets of LED and zener diodes, or composed by the two aforementioned sets of LED and zener diodes in individual structures with external conductors to make reverse polarity series connection;

the installation methods for its external conducting interface devices include one of:

(i) the installation of a conducting interface device at terminal (a) which is the connection terminal of the first LED and zener diode set of the voltage-limiting and reverse polarity series type LED device; the installation of a conducting interface device at terminal (b) which is the connection terminal of the first LED and zener diode set with the second LED and zener diode set in reverse polarity series connection; and the installation of a conducting interface at terminal (c) which is the connection terminal of the second LED and zener diode set for application on alternating current power or direct current power polarity alternation; and (ii) the installation of a conducting interface device at terminal (a) which is the connection terminal of the first LED and zener diode set of the voltage-limiting and reverse polarity series type LED device; the non-installation of a conducting interface device at the connection terminal of the first LED and zener diode set with the second LED and zener diode set in reverse polarity series connection;

and the installation of a conducting interface at the terminal (c) which is the connection terminal of the second LED and zener diode set for application on alternating current power or alternating polarity direct current power; and wherein alternating current power or alternating polarity direct current power is applied to the voltage-limiting and reverse polarity series type LED device and a current-limiting impedance element (400) is series-connected between the conducting interface device at terminal (a) or the conducting interface device at terminal (c) of the voltage-limiting and reverse polarity series type LED device and the alternating current power or the alternating polarity direct current power and/or connect the current-limiting impedance element (401) in series with LED (101) and/or connect the current-limiting impedance element (402) with LED (102);

the impedance elements are constituted by one or more impedance elements which include 1) resistive impedance elements 2) capacitive impedance elements 3) inductive impedance elements 4) linear transistor impedance elements 5) chopped wave switch type elements composed of solid state switch type elements 6) chopped wave switch type elements composed of thyristors; and the series connection positions of the aforementioned impedance elements include 1) the impedance elements first connect with individual LEDs in series then connect in parallel with the zener diode; and/or 2) the impedance element is series-connected between the power source and the voltage-limiting and reverse polarity series type LED device; and/or 3) the LED and the diode with the same working polarity first connect in parallel then connect in series with the impedance element.

2. The voltage-limiting and reverse polarity series type LED device as claimed in claim 1, when alternating current power or alternating polarity direct current power is delivered from the (a) terminal conducting interface device and the (c) terminal conducting interface device, the voltage-limiting and reverse polarity series type LED device is made to function as a alternating current LED, moreover, during various voltage polarities, zener diode (501) and zener diode (502) provide voltage-limiting protection for the parallel-connected LED (101) and LED (102); when the working LED (102) is at the first polarity status, the alternating current power or the alternating polarity direct current power relies on the reverse polarity diode function of the zener diode (501) to pass electrical current through LED (102); and when the alternating current power or the alternating polarity direct current power changes to the second polarity (opposite to the first polarity) status, it relies on the reverse polarity diode function of diode (502) to pass electrical current through LED (101).

3. The voltage-limiting and reverse polarity series type LED device as claimed in claim 1, when (a) terminal conducting interface device connects with terminal (c) conducting interface device, their connection terminal and terminal (b) commonly allow direct current to pass through LED (101) and LED (102); zener diode (501) and zener diode (502) together provide voltage-limiting protection for LED (101) and LED (102) to enable the voltage-limiting and reverse polarity series type LED device to run with direct current LED functions.

4. The voltage-limiting and reverse polarity series type LED device as claimed in claim 1, wherein the zener diode which provides the voltage-limiting protection for the LED of the voltage-limiting and reverse polarity series type LED device are replaceable with electrical devices which include semiconducting elements and devices and machine electronics with voltage-limiting effects and reverse polarity conduction.

5. The voltage-limiting and reverse polarity series type LED device as claimed in claim 1, wherein the specifications for power, voltages, currents and numbers as well as the series or parallel or series-parallel connections of LED (101) and LED (102) are the same with or different from each other; the colors of lights emitted by the energized LED (101) and LED (102) are the same with or different from each other.

6. The voltage-limiting and reverse polarity series type LED device as claimed in claim 1, wherein the types and specifications of the zener diode (501) and zener diode (502) are the same with or different from each other.

7. A voltage-limiting and reverse polarity series type LED device that parallel-connects one or more homopolar parallel-connected or series-connected or series and parallel-connected LEDs and zener diodes of the same working polarity in order to form the first LED and zener diode set; and a second LED and zener diode set constituted of one or more homopolar parallel-connected or series-connected or parallel and series-connected LEDs connected in parallel with zener diodes of the same working polarity, wherein through the reverse-polarity series connection of the first LED and zener diode set with the second LED and zener diode set, a voltage-limiting and reverse polarity series type LED device is formed, said voltage-limiting and reverse polarity series type LED device comprising:

LED (101): composed of one or more homopolar parallel-connected or series-connected or series and parallel-connected light-emitting diodes;

LED (102): composed of one or more homopolar parallel-connected or series-connected or series and parallel-connected light-emitting diodes;

zener diodes (501), (502): composed of one or more zener diodes or electrical devices of the same function that during multiple installations, are connected in parallel or in series or in series and parallel, wherein:

LED (101) and zener diode (501) of the same working polarity are connected in parallel to constitute the first LED and zener diode set; LED (102) and zener diode (502) of the same working polarity are connected in parallel to constitute the second LED and zener diode set;

the voltage-limiting and reverse polarity series type LED device is constituted by the reverse polarity series connection of the first LED and zener diode set with the second LED and zener diode set;

the voltage-limiting and reverse polarity series type LED device is an integrated package composed of the two aforementioned sets of LED and zener diodes, or composed by the two aforementioned sets of LED and zener diodes in individual structures with external conductors to make reverse polarity series connection;

the installation methods for its external conducting interface devices include one of:

(iii) the installation of a conducting interface device at terminal (a) which is the connection terminal of the first LED and zener diode set of the voltage-limiting and reverse polarity series type LED device; the installation of a conducting interface device at terminal (b) which is the connection terminal of the first LED and zener diode set with the second LED and zener diode set in reverse polarity series connection; and the installation of a conducting interface at terminal (c) which is the connection terminal of the second LED and zener diode set for application on alternating current power or direct current power polarity alternation or direct current power; and the installation of a conducting interface device at terminal (a) which is the connection terminal of the first LED and zener diode set of the voltage-limiting and reverse polarity series type LED device; the non-installation of a conducting interface device at the connection terminal of the first LED and zener diode set with the second LED and Zener diode set in reverse polarity series connection; and the installation of a conducting interface at the terminal (c) which is the connection terminal of the second LED and Zener diode set for application on alternating current power or alternating polarity direct current power; and, wherein a current-limiting impedance element (400) if further connected between the alternating power source and terminal (a) and/or terminal (c) of the voltage-limiting and reverse polarity series type LED device; and/or a current-limiting impedance element (401) is connected in series to LED (101) and/or a current-limiting impedance element (402) is connected in series with LED (102); zener diode (501) is connected in parallel in between terminal (a) and terminal (b), zener diode (502) is connected in parallel in between terminal (b) and terminal (c); both terminals of zener diode (501) are connected in parallel with the power storing and discharging device (301) and/or both terminals of zener diode (502) are connected in parallel with a power storing and discharging device (302); their polarities during the delivery of alternating current power are such that they assume a power supply status with respect to the LED with which they are connected in parallel; when the power supply voltage is higher than the voltage of its parallel-connected power storing and discharging device, the power source simultaneously supplies power to the LED and charges the power storing and discharging device with which it is connected in parallel; the polarities of the alternating current power supply do not supply power to its parallel-connected LED or when the power supply voltage is lower than the voltage of the power storing and discharging device, the power storing and discharging device will supply power to the LED with which it is connected in parallel;

by means of the operation of the power storing and discharging device, the following partial or complete functions are attained: 1) enables two LEDs to deliver power and emit light without being affected by the polarity changes of the alternating current power source; 2) when alternating current power is driving the LED, optical pulsation of the LED is reduced; 3) supplies delay electric energy for LED when power is cut off; 4) serves as power supply to allow continuous lighting of LEDs during an emergency power shutdown; the power storing and discharging device is consisted of a rechargeable battery or a monopolar or bipolar capacitance or super capacitance.

8. The voltage-limiting and reverse polarity series type LED device as claimed in claim 7, wherein the current-limiting impedance element (400) is series connected to the (a) or (c) terminals of the alternating current power and the reverse polarity series type LED and/or a current-limiting impedance element (401) is series connected to LED (101), and according to the direction of the light-emitting current of LED (101), it is connected in series with diode (203), then through the current input terminal of diode (203) and the current output terminal of LED (101), it assumes the same working current flow and connects in parallel with zener diode (501) in order to protect LED (101) i.e., zener diode (501) is for parallel connection to terminal (a) and terminal (b); and/or a current-limiting impedance element (402) is series-connected to LED (102), and according to the direction of light-emitting current of LED (102), it is connected in series to diode (204), and then through the current input end of diode (204) and the current output end of LED (102), it assumes the same current flow and connects in parallel with zener diode (502) in order to protect LED (102) i.e., zener diode (502) is for parallel connection to terminal (b) and terminal (c); a power storing and discharging device (301) is connected in parallel between the joint connecting diode (203) and the current-limiting impedance element (401) and the current output terminal of LED (101), and/or a power storing and discharging device (302) is connected in parallel between the joint connecting diode (204) and current-limiting impedance element (402) and the current output terminal of LED (102); their polarities during the delivery of alternating current power are such that they assume a power supply status with respect to the LED with which they are connected in parallel; when the power supply voltage is higher than the voltage of its parallel-connected power storing and discharging device, the power source simultaneously supplies power to the LED and charges the power storing and discharging device with which it is connected in parallel; the polarities of the alternating current power supply do not supply power to its parallel-connected LED; when the power supply voltage is lower than the voltage of the power storing and discharging device, the power storing and discharging device will supply power to the LED with which it is connected in parallel;

by means of the operation of the power storing and discharging device, the following partial or complete functions are attained: 1) enables two LEDs to deliver power and emit light without being affected by the polarity changes of the alternating current power source; 2) when alternating current power is driving the LED, optical pulsation of the LED is reduced; 3) supplies delay electric energy for LED when power is cut off; 4) serves as power supply to allow continuous lighting of LEDs during an emergency power shutdown; the power storing and discharging device is consisted of a rechargeable battery or a monopolar or bipolar capacitance or super capacitance.

9. The voltage-limiting and reverse polarity series type LED device as claimed in claim 7 or claim 8 is applied on alternating current power and connected in parallel with the power storing and discharging devices, the current-limiting impedance element (400) and/or current-limiting impedance elements (401) and/or current-limiting impedance element (402) are optionally installed.

10. The voltage-limiting and reverse polarity series type LED device as claimed in claim 7 or claim 8, wherein the zener diode (501) connected in parallel between terminal (a) and terminal (b) of the voltage-limiting and reverse polarity series type LED device and/or zener diode (502) connected in parallel with terminal (b) and terminal (c) of the voltage-limiting and reverse polarity series type LED device are revised, installed, and connected in parallel with LED (101) and/or LED (102), or installed on both locations.

11. The voltage-limiting and reverse polarity series type LED device as claimed in claim 7 or claim 8, wherein types and specifications of the current-limiting element (400) and/or current-limiting element (401) and/or current-limiting element (402) are the same with or different from each other; the current-limiting impedance element (400) and/or the current-limiting impedance element (401) and/or the current-limiting impedance (402) are fixed impedances and adjustable impedance values or clipping controlled or linear controlled in order to control LED light adjustments; this includes simultaneous or separate control of LED (101) and LED (102).

12. The voltage-limiting and reverse polarity series type LED device as claimed in claim 7 or claim 8 wherein the types and specifications of the power storing and discharging device (301) and/or power storing and discharging device (302) are the same with or different from each other.

13. The voltage-limiting and reverse polarity series type LED device as claimed in claim 1, 3, 7, or 8 whereof the structural modes include:

1) the individual elements that constitute the voltage-limiting and reverse polarity series type LED device are independent structures; the external connections and individual elements rely on conducting interface devices such as conduction terminals, and/or conducting wire, and/or electrical conductors, and/or plugs, and/or sockets to connect or solder or lock for connections; and/or 2) two or more individual elements form an integrated package and conducting interface devices are installed; the external connections and individual elements of other parts rely on conducting interface devices such as conduction terminals, and/or conducting wire, and/or electrical conductors, and/or plugs, and/or sockets to connect or solder or lock for connections; and/or 3) the first LED and zener diode set is an integrated package and conducting interface devices are installed; the second LED and zener diode set is an integrated package and conducting interface devices are installed; between them, conducting interface devices such as conduction terminals, and/or conducting wire, and/or electrical conductors, and/or plugs, and/or sockets make connections or solder or lock for connections; and/or 4) the whole voltage-limiting and reverse polarity series type LED device is integrated into a single package; conducting interface devices such as conduction terminals, and/or conducting wire, and/or electrical conductors, and/or plugs, and/or sockets are installed to make external connections or methods such as soldering or locking are used for external connections.

* * * * *